Sept. 6, 1949.  T. R. NEUTELINGS ET AL  2,480,951
BAKING OVEN
Filed Nov. 16, 1946
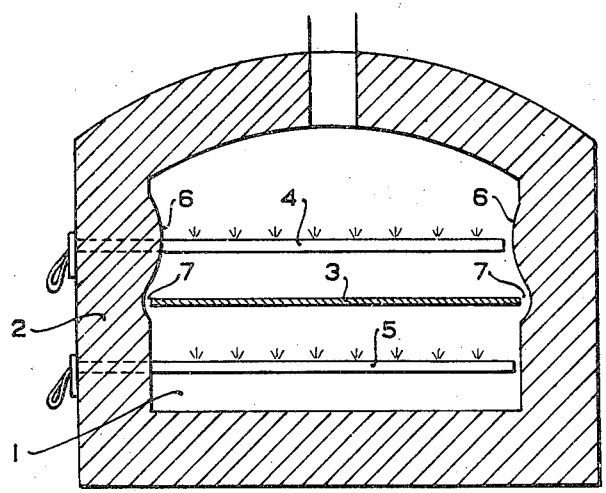
Inventors:
Theodoor R Neutelings
and William Neutelings Patented Sept. 6, 1949

2,480,951

UNITED STATES PATENT OFFICE 2,480,951

BAKING OVEN

Theodoor R. Neutelings and Willem Neutelings, Bergen op Zoom, Netherlands, assignors to Industrie- en Handelmaatschappij "De Vuurslag" C. V., Bergen op Zoom, Netherlands, a company of The Netherlands Application November 16, 1946, Serial No. 710,342
In the Netherlands May 7, 1942

Section 1, Public Law 690, August 8, 1946
Patent expires May 7, 1962

2 Claims. (Cl. 107—55)

This invention relates to an oven for baking articles of food, such as bread, biscuits, pastry, cake and the like.

In the usual continuously operating ovens for this purpose, the baking room has the shape of a horizontal tunnel through which the articles to be baked are carried by means of a conveyor, which may consist alternatively of endless chains, a band of steel or a band of wire mesh.

Ovens of this kind may be operated by direct heating, and in this instance the heating elements, e. g. gas burners, are arranged in the baking room, or by indirect heating, in which instance the heating elements are placed in a separate room, adjacent to the baking room, but separated therefrom, or in which heating flues are provided around the baking room. The horizontal tunnel, forming the baking room of such ovens, is bounded at the side-walls by vertical or substantially vertical planes.

With direct as well as with indirect heating these side-walls give off the absorbed heat to the over gases by radiation, as well as by contact. This presents the drawback that the radiant heat-energy from the side-walls is mainly heating the sides of the conveying device, so that the central part thereof remains at a considerably lower temperature, with the result that the bakery goods at the margins of the conveyor often receive too much heat. Moreover the irregular heating of the conveyor, mainly when the latter consists of a band of steel can cause unevenness at the margins thereof, due to excessive local expansion, whereby the regular running of the conveyor will be detrimentally influenced and the baked goods will be damaged, so that they ought to be rejected.

The invention has for its object to prevent a too intense heating of the side-walls of the oven by giving these walls a particular shape. According to the invention, the side-walls of the baking room above the conveyor, are provided with a part projecting into the baking room and having a segmental shape in vertical section and extending in the longitudinal direction of the baking room. The heat absorbed and accumulated by the side-walls and also the part of the heat falling on said walls but reflected, thereby, is divergingly emitted by the segmental parts, so that an additional heating of the sides of the conveyor is wholly or almost wholly prevented and the conveyor over its whole width obtains a uniform or substantially uniform temperature.

Furthermore these segmentally shaped parts of the sidewalls of the baking room prevent the heat-rays from the upper part of the baking room from unimpededly reaching the floor of the baking room along the side-edges of the conveyor and unfavourably influencing the temperature control of the baking space below the conveyor.

In order to further the favourable effect of the particular shape of the side-walls of the baking room, a correspondingly shaped recess may be joined to the lower end of the inwardly projecting segmentally shaped part.

The drawing diagrammatically illustrates the cross section of a baking oven for direct heating, according to the invention.

The baking room 1 is enclosed by a wall 2 consisting of heat-insulating material. A conveyor 3 which carries the products to be baked runs through the baking room. Above and below the conveyor burners 4, 5 are provided from which the upper burners 4 direct their flames upwards and thus not directly upon the conveyor 3.

The part of the side-walls of the baking room above the conveyor 3 is bounded by a curved surface to the lower end of which is joined a recess 7. As stated above, the segmentally shaped parts 6 will emit the absorbed and thereafterwards radiated heat, divergingly into the baking room, so that a uniform distribution of the radiant heat is secured.

It should be noticed that the illustrated form of the side-walls of the baking room, may also be applied to ovens the roof of which is not vaulted, but plane, as well as to ovens with direct heating, the upper burners of which direct their flames normally toward the conveyor.

What we claim is:

1. A baking oven having a baking room formed as a horizontal tunnel, through which the goods to be baked are carried by a conveyor, the sidewalls of the baking room above the conveyor, being provided, with a part projecting into the baking room and having a segmental shape in vertical section, said projecting part extending in the longitudinal direction of the baking room.

2. A baking oven according to claim 1, characterized in that, at the lower end of the segmentally shaped, inwardly projecting part is joined a correspondingly shaped recess.

THEODOOR R. NEUTELINGS.
WILLEM NEUTELINGS.

REFERENCES CITED

The following references are of record in the file of this patent:

UNITED STATES PATENTS

| Number | Name | Date |
|---|---|---|
| 1,663,116 | Comstock | Mar. 20, 1928 |